United States Patent
Rumell et al.

(10) Patent No.: US 7,530,552 B1
(45) Date of Patent: *May 12, 2009

(54) EXHAUST GAS TREATMENT DEVICE AND METHOD

(75) Inventors: Demetrius A. Rumell, New Castle, IN (US); Joann Dickerson, legal representative, New Castle, IN (US); Joseph J. Rumell, Martinsville, IN (US); Fred A. VanDevander, Fishers, IN (US)

(73) Assignee: EnviroPure Industries, Inc., Fishers, IN (US)

( * ) Notice: Subject to any disclaimer, the term of this patent is extended or adjusted under 35 U.S.C. 154(b) by 88 days.

This patent is subject to a terminal disclaimer.

(21) Appl. No.: 11/447,650

(22) Filed: Jun. 6, 2006

(51) Int. Cl.
*F01N 3/02* (2006.01)
*B01D 47/02* (2006.01)

(52) U.S. Cl. ............................. 261/4; 261/30; 261/126

(58) Field of Classification Search ................. 261/4, 261/30, 126
See application file for complete search history.

(56) References Cited

U.S. PATENT DOCUMENTS

| 2,420,185 A | 5/1947 | Messmore |
| 2,612,745 A | 10/1952 | Vecchio |
| 2,943,845 A | 7/1960 | Jaklitsch |
| 3,957,467 A | 5/1976 | Kim |
| 4,210,176 A | 7/1980 | Emming |
| 4,300,924 A | 11/1981 | Coyle |
| 4,448,593 A | 5/1984 | Spiers |
| 5,251,603 A | 10/1993 | Watanabe et al. |

*Primary Examiner*—Taofiq A Solola
(74) *Attorney, Agent, or Firm*—Woodard, Emhardt, Moriarty, McNett & Henry LLP

(57) ABSTRACT

A device and methods related to the same are provided for the treatment of exhaust gases. An exhaust gas treatment device is provided comprising a tank, a liquid bath, and a scrubber unit, the exhaust gas being passed through the liquid bath to treat the gas of exhaust products and through a scrubber unit to scrub the treated gas and remove any entrained bath therefrom on a plurality of condensing surfaces. The condensate of entrained gas may be collected and recirculated to the liquid bath in the tank. The exhaust gas may be delivered to the tank for passing it through the liquid bath and through a filter for the removal of exhaust products prior to being expelled through an exhaust port into the atmosphere. The liquid bath may comprise a solution of one or more organic solvents selected to configure the bath to remove exhaust products as desired.

30 Claims, 3 Drawing Sheets

EXHAUST GAS TREATMENT DEVICE AND METHOD

DETAILED DESCRIPTION OF VERSIONS OF THE INVENTION

Figure 1:
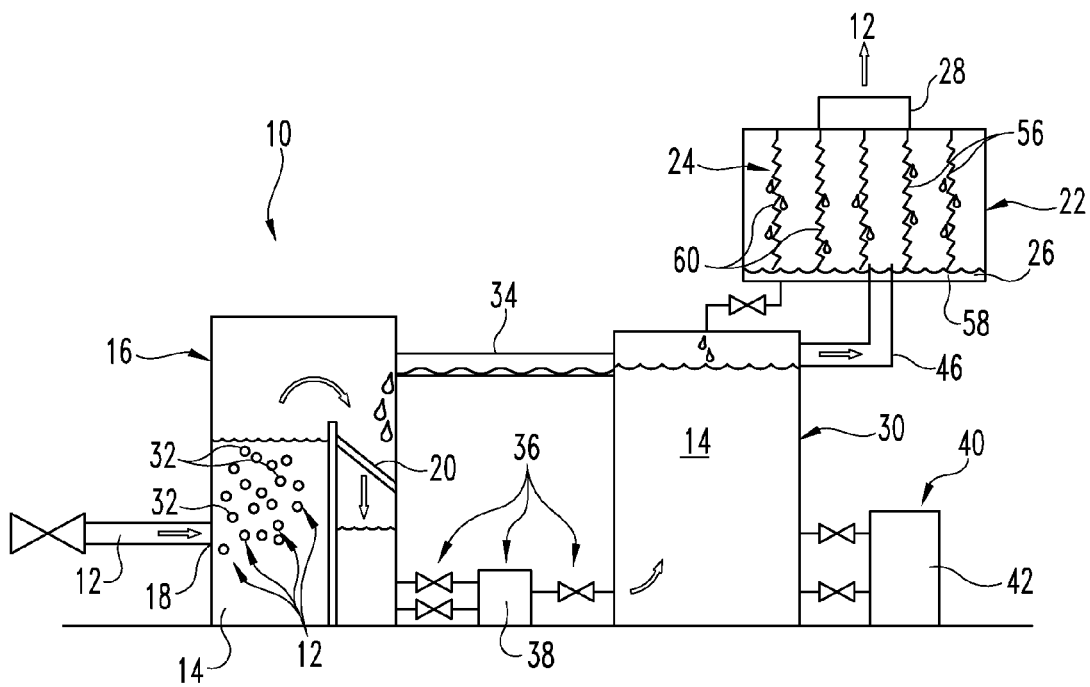
FIG. 1 illustrates a side cut-away view of one version of an exhaust gas treatment device according to the present invention.

Although the disclosure hereof is detailed and exact in order to enable those skilled in the art to practice the invention, the physical versions herein disclosed merely exemplify the invention which may be embodied in other specific structure. The scope of the invention is defined in the claims appended hereto.

Referring now to FIGS. 1-5, a device 10 is shown for treating exhaust gases 12 with a liquid bath 14. The device 10 comprises a tank 16 containing the liquid bath 14 and means for introducing exhaust gas 12 to the liquid bath 14 and expelling bathed gases into the atmosphere. The liquid bath 14 is selected in accordance with specific requirements for removing various exhaust products from the gas 12 by physical or chemical reaction therebetween. Examples of exhaust products for removal include carbon monoxide, nitrous compounds, and sulfous compounds. In one version, the liquid bath comprises a solution of one or more organic solvents.

The tank 16 of the device 10 comprises an exhaust gas inlet 18 connected thereto for introducing exhaust gas 12 to the tank 16. In one version, the tank 16 further comprises a filter 20 supplementally provided therein proximate to the liquid bath 14 and through which exhaust gas 12 flows. The device 10 further comprises a scrubber unit 22 that is communicatively connected to the tank 16. In one version, the scrubber unit 22 is configured to receive the exhaust gas 12 after it has initially passed through the liquid bath 14 in the tank 16. In other versions, the unit 22 is configured to receive exhaust gas 12 essentially simultaneously as the gas 12 comes in contact with the liquid bath 14 in the tank 16 (e.g. FIG. 4).

As exhaust gas 12 is bathed in the liquid bath 14, it becomes entrained with some of the bath. In order to conserve the amount of liquid bath 14 required for use of the device 10, and in order to substantially prevent expelling entrained bath into the atmosphere, the scrubber unit 22 is provided with the device 10 and comprises a plurality of condensing surfaces 24 configured for substantially removing the liquid bath 14 entrained in the gas 12 as condensate 26. Condensate 26 is collected by the scrubber unit 22 and recirculated for further use in the device 10. An exhaust port 28 is communicatively connected to the scrubber unit 22 for expelling the treated and scrubbed exhaust gas 12 to the atmosphere.

In operation, exhaust gas 12 containing various exhaust products is delivered to the tank 16 and introduced to the liquid bath 14. The exhaust gas 12 flows through the liquid bath 14 and through the filter 20, the liquid bath 14, and the filter 20 being adapted for removing exhaust products from the exhaust gas 12. The exhaust gas 12 entrained with the liquid bath 14 also passes through the scrubber unit 22 for collection of condensate 26 of the liquid bath 14 from the treated exhaust gas 12 which is then expelled through the exhaust port 28 into the atmosphere.

The general nature of the structure of the exhaust gas treatment device 10 of the present invention being thus described, a person of ordinary skill in the art will appreciate the various structural versions of such device 10, all of which are within the scope of this detailed description and of the several claims appended hereto. None of the following descriptions of various versions of the device 10 are intended to limit the scope of this disclosure or the appended claims.

Referring now to FIG. 1, in one version the device 10 comprises a two tank system, the first tank 16 containing an amount of the liquid bath 14 into which the exhaust gas 12 is initially introduced, the second tank comprising a reservoir tank 30 containing an additional amount of the liquid bath 14. In other versions, the exhaust gas 12 entrained with liquid bath 14 from the first tank 16 subsequently flows through the liquid bath 14 of the reservoir tank 30 before delivery of the entrained exhaust gas 12 to the scrubber unit 22.

The gas inlet 18 in the first tank 16 may be provided below the level of the liquid bath 14 such that the exhaust gas 12 is bubbled 32 into the liquid bath 14. In other versions, the exhaust gas 12 having bubbled 32 through the liquid bath 14 supplementally flows through a filter 20 in the first tank 16. In yet other versions, the first tank 16 and reservoir tank 30 are communicatively connected by an overflow line 34 configured to allow liquid bath 14 from the reservoir tank 30 to flow into the first tank 16 when the level of the liquid bath 14 in the reservoir tank 30 reaches a maximum level. In yet other versions, a supplemental pipe system 36 fluidly connects the tank 16 and reservoir tank 30, such system 36 comprising one or more recirculating pumps 38 configured to circulate liquid bath 14 between the first tank 16 and the reservoir tank 30. The pipe system 36 may further be employed to draw liquid bath 14 from the first tank 16 containing bubbled exhaust gas 12 into the reservoir tank 30. The gas 12 then passes through to the scrubber unit 22.

In one version, the liquid bath 14 comprises a solution of one or more organic solvents configured for removing exhaust products from the exhaust gas 12. The removal process may be by dissolution of the exhaust products by the liquid bath as the gas 12 is contacted by the liquid bath 14 or by absorption by the exhaust products into the liquid bath 14 by physical or chemical reaction with the solvent(s) in the bath. The effectiveness of the removal may be enhanced by increasing the number or length of times the gas 12 contacts liquid bath 14 in the device 10. In one version, the liquid bath 14 comprises a solution of hydrocarbon compounds, including compounds having one or both of aromatic and aliphatic structures. The aromatic and/or aliphatic compounds may be provided as desired. In one version, such compounds comprise one or more organic solvents configured for removing exhaust products from the exhaust gas 12 as the exhaust gases pass through the liquid bath 14. These exhaust products may include carbon monoxide, nitrous compounds and sulfur compounds or other exhaust products or industrial contaminants. In one version of liquid bath 14, increases in viscosity as the liquid bath removes exhaust products from the exhaust gas 12. A viscosity measurement of the liquid bath 14 which is below a standard viscosity measurement of the bath having a near maximum amount of exhaust products in the liquid bath 14 indicate remaining capacity whereas viscosity measurements for the liquid bath 14 higher than the standard viscosity measurement would generally indicate lower or no remaining capacity for the liquid bath 14 to remove additional exhaust products. The liquid bath 14 then must be regenerated or replaced.

Generally, as the liquid bath 14 removes exhaust products from the exhaust gas 12 and gains in viscosity, the weight and density of liquid bath 14 also increases. Thus, the density of the liquid bath 14 may also be used to indicate the remaining capacity of the liquid bath 14 or the point at which the liquid bath 14 has no remaining capacity to remove exhaust products from the exhaust gas 12.

For one version wherein the liquid bath 14 comprises organic material, the standard viscosity measurement for the liquid bath 14 prior to removal of any exhaust products is about 1 centipoise. Moderate remaining capacity of the liquid bath 14 would correspond to viscosity measurements between about 1½ and about 2 centipoises and low or no remaining capacity of liquid bath 14 would correspond to viscosity measurements about 4 centipoises and greater.

In other versions, a photo sensor device is configured to measure light refraction through the liquid bath 14 at any given time. In such versions, a lower refraction index generally indicates greater remaining capacity, and a higher refraction index indicates lower or no remaining capacity. This is based upon the premise that as the concentration of exhaust products retained in the liquid bath 14 increases, the refraction index of the liquid bath 14 also increases. While in a specific version wherein the liquid bath 14 comprises organic material upper and lower ranges of infraction index cannot be specified, the refraction indexes corresponding to the bath 14 having moderate remaining capacity and no remaining capacity will be commensurate with the viscosity and density measurements above discussed.

The liquid bath 14 generally comprises a solution of one or more organic solvents capable of removing the exhaust products from the exhaust gas as the exhaust gas passes through the liquid bath 14. The removal process may be by dissolution of the exhaust gas by the liquid bath 14 as the gases pass through or by absorption of the liquid exhaust products into the liquid bath 14 by physical or chemical reaction with the bath 14. The effectiveness of the removal may be enhanced by increasing the contact between the liquid bath and the exhaust gases by any of a number of techniques well known to those skilled in the art or any combination thereof. In one version, liquid bath 14 comprises a solution of hydrocarbon compounds including compounds having one or both of aromatic and/or aliphatic structures. The aromatic and/or aliphatic compounds may be provided as desired. In other versions, the liquid bath 14 comprises a plurality of short chain alkane fragments condensed from fumes collected from a heated asphaltic impregnate. It also may be desirable to boil liquid bath 14 comprising a solution of liquid hydrocarbon compounds. In many instances, such a solution may have a low flash point relative to the temperature of the exhaust gases 12. Considering the exhaust gas may be at elevated temperatures, optimum 1,800° F., it may be necessary to cool the exhaust gases prior to the flow through the device. In one version, exhaust gases are cooled down to between about 300° and 600° F. In other versions, the exhaust gases are cooled down at least below the flash point of the liquid bath actually used in the device.

In other versions, a liquid hydrocarbon bath 14 comprises a plurality of short chained alkane fragments. One method of preparing a suitable liquid hydrocarbon bath 14 comprises the steps of heating an asphaltic impregnant to between about 450 degrees Fahrenheit and about 510 degrees Fahrenheit, extracting fumes from the heated impregnant into a first chamber and preventing the fumes from escaping from the first chamber, then passing the fumes to a second chamber, and cooling the second chamber sufficiently to condense the fumes within the second chamber. The condensate of the fumes is then decanted from the second chamber and collected for use in an exhaust gas treatment device 10.

In versions of the present invention in which a liquid hydrocarbon bath 14 comprises short chained alkane fragments, and in which the temperature of exhaust gases 12 exceeds the boiling point of such a liquid bath 14, it may be necessary to provide a thermal reducer 40 in conjunction with the exhaust gas treatment device 10. For example, in one version comprising a tank 16 and a reservoir tank 30, the reservoir tank 30 may further comprise a cooling heat exchanger 42 communicatively connected thereto and configured for recirculating the liquid bath 14 from the reservoir tank 30 into the cooling heat exchanger 42 and back into the reservoir tank 30.

Bath 14 in the reservoir tank 30 may be supplied to the tank 16 through the overflow line 34 or other fluid connection means, e.g. supplemental pipe system 36, between the tanks 16, 30. Persons of ordinary skill in the art will appreciate that several different types of heat exchangers 42 may be provided for sufficiently cooling the liquid bath 14 such that introduction of an exhaust gas 12 with a temperature above the boiling point of the liquid bath 14 will not cause the liquid bath 14 to reach its boiling point.

Figure 2:
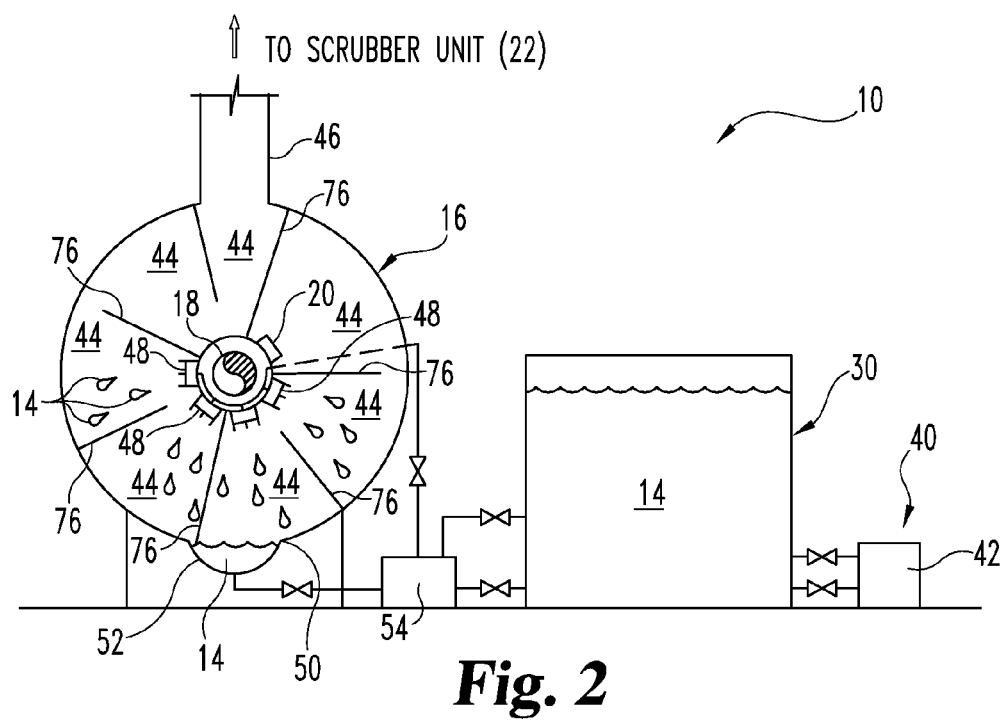
FIG. 2 illustrates a side cut-away view of an alternative version of an exhaust gas treatment device.

Referring now to FIG. 2, in an alternative version of the device 10, a multi-chambered tank 16 is provided for removing exhaust products from the exhaust gas 12 by airborne introduction of the exhaust gas 12 to the liquid bath 14. In one version, the tank 16 comprises a plurality of baffle chambers 44 through which exhaust gas 12 must flow between the gas inlet 18 and a line 46 connecting the tank 16 to a scrubber unit 22. In other versions, at least one of the baffle chambers 44 comprises a plurality of spray nozzles 48 through which liquid bath 14 is sprayed into the chamber 44. The liquid bath 14 may be delivered from an amount of the bath 14 contained in the bottom 50 of the tank 16 or from a reservoir tank 30 fluidly connected to the spray nozzle(s) 48. Liquid bath 24 is sprayed through the spray nozzle(s) 48 into the one or more baffle chambers 44 through which exhaust gas 12 is flowing between the inlet 18 and the connecting line 46. In other versions, spray nozzles 48 are optimally configured within a baffle chamber 44 for substantially contacting the exhaust gas 12 as it flows therethrough. In yet other versions, the spray nozzles 48 are configured for delivering a mist of the liquid bath 14 under pressure into at least one baffle chamber 44 for substantially mixing with the gas 12 flowing through the chamber 44. In yet other versions, the tank 16 comprises a drain 52 in the bottom 50 for collecting the liquid bath 14 sprayed through the spray nozzles 48. The bath 14 collected in the drain 52 may be delivered directly back to the spray nozzles 48 or back into the reservoir tank 30 using suitable pumping means 54.

As an example of the volumetric capacity of operation of the version of the device 10 of FIG. 2, a multi-chambered tank 16 is provided with four baffle chambers 44 configured with spray nozzles 48 for bathing the exhaust gas 12. Additional non-bathing baffle chambers 44 may also be provided. Each of the four bathing baffle chambers 44 is configured with six spray nozzles 48, for a total of twenty-four spray nozzles 48. A pump 54 is provided for delivering liquid bath 14 through the spray nozzles 48. In one version, the pump 54 delivers 10 gallons per minute through each spray nozzle 48 for a total of 240 gallons per minute, or 14,400 gallons per hour. In other versions, the overall throughput of the pump 54 selected for the device is 250 gallons per minute and delivered at 100 p.s.i. for effective spray delivery. In yet other versions, the pump 54 has a work capacity of 5 h.p.

In the version including all of the structure described in the preceding paragraph, 1,000 cubic feet of exhaust gases 12 can be treated with 8,000 gallons of a liquid hydrocarbon bath 14 utilizing a storage tank 30 which is 10 feet in diameter and 12.5 feet tall. The bath 14 is maintained at the point of contact with the gases 12 at about 475° F. The bath 14 absorbs or reacts or causes a reaction of the materials to be removed from the gases 12 (normally hydrocarbons of aromatic and aliphatic structures or short chain fragments of alkanes) to withdraw all of the pollutants that would normally be vented through a stack into the atmosphere. All of the materials extracted are then allowed to cool to room temperature where phasing and separation occurs between the solution and the extracted material. The extracted material is straw oil which is used as a perfume base and can be sold commercially. In one specific version, light ends not absorbed by the bath may be further oxidized or reacted through the use of potassium permanganate added to the bath 14.

FIG. 1 shows one version of a scrubber unit 22 having condensing surfaces 24 comprising a plurality of scrubbers 56 configured to strip entrained liquid bath 14 from the gas 12 by impingement of the gas 12 upon the scrubbers 56. In one version, liquid bath 14 condenses onto the scrubbers 56. In other versions, scrubbers 56 are oriented to permit the condensate 26 to drain into an accumulator portion 58 of the scrubber unit 22 for being returned to the liquid bath 14 in the tank 16 or in the reservoir tank 30. In yet other versions, the scrubbers 56 comprise a plurality of corrugated droplet retainers 60 for receiving condensate 26 of liquid bath 14.

Figure 3:
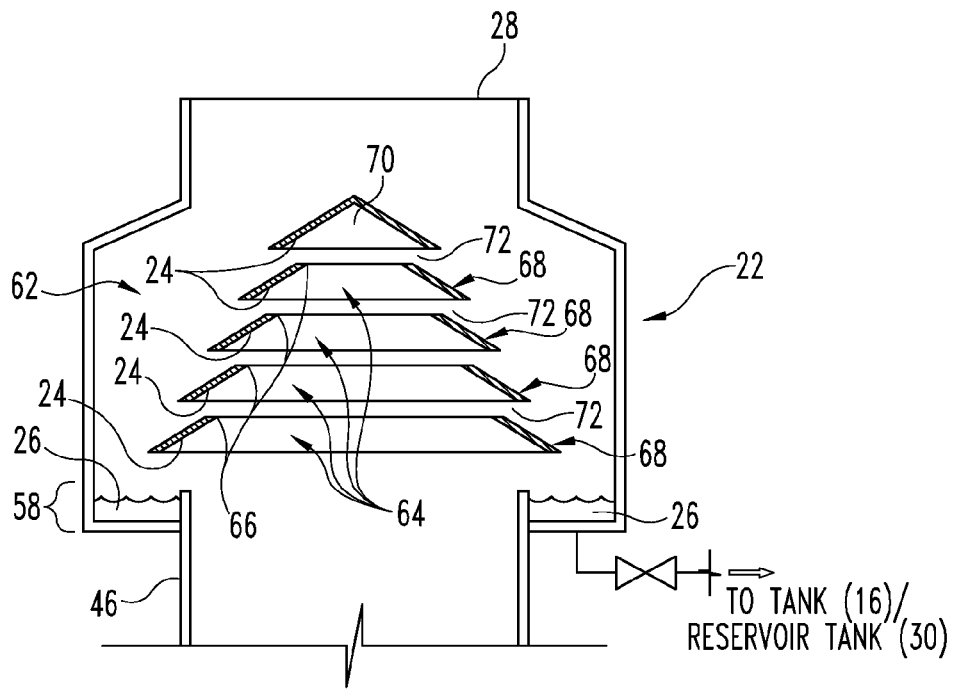
FIG. 3 illustrates a side cross-sectional view of one version of a scrubber unit.

A person of ordinary skill in the art will appreciate that other suitable scrubber 56 configurations may also be employed to provide sufficient condensing surfaces 24. In an alternative version, the scrubbers 56 comprise a stacked series 62 of generally flat rings 64, each ring 64 having a smaller condensing surface area than the one below it, and each having a generally central aperture 66. Each ring 64 comprises annular side portions 68 to provide condensing surfaces 24 that are generally angularly downwardly oriented for receiving condensate 26 of the liquid bath 14 and radially directing the condensate 26 to the accumulator portion 58. The series 62 in other versions further comprises a cap 70 having no aperture therethrough. As shown in FIG. 3, the stacked series 62 of scrubber rings 64 are generally spaced apart such that exhaust gas 12 entering the scrubber unit 22 below the stack flows through the aperture 66 of the lowest ring 64 and may travel both radially through the gap 72 between such ring 64 and the next ring, and axially up through the apertures 66 in the rings, and so on. The exhaust gas 12 being substantially scrubbed of the entrained liquid bath 14 in this way, it is then expelled through the exhaust port 28 into the atmosphere.

Figure 4:
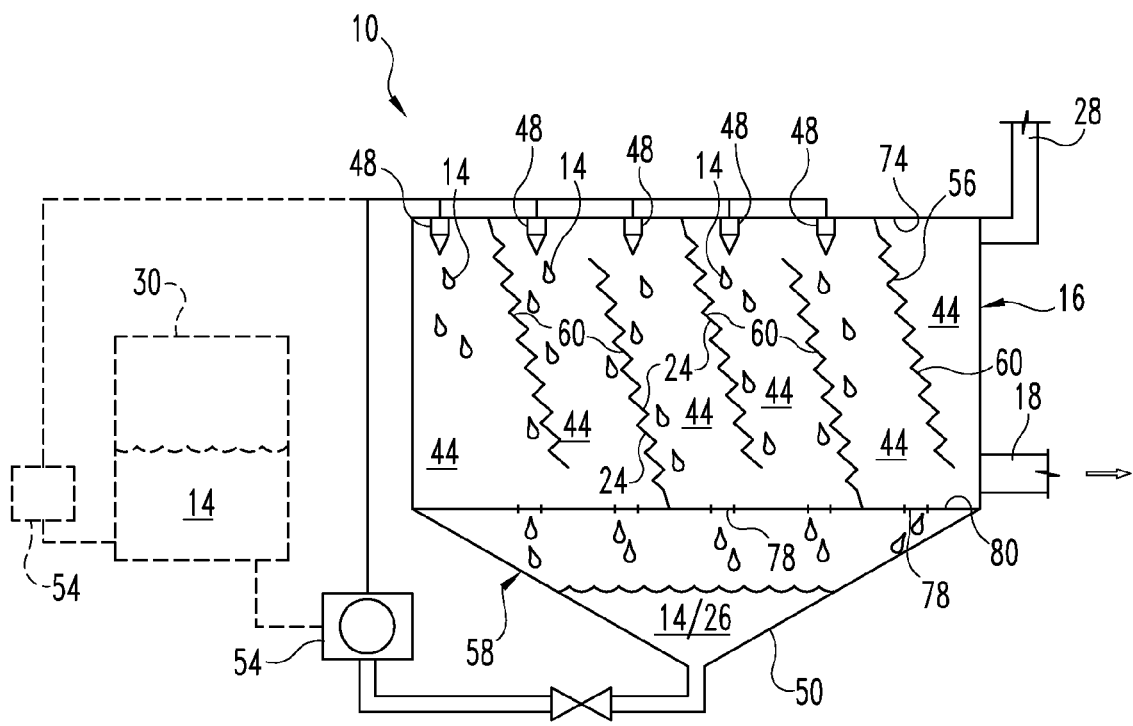
FIG. 4 illustrates a side cut-away view of another version of an exhaust gas treatment device.
Figure 5:
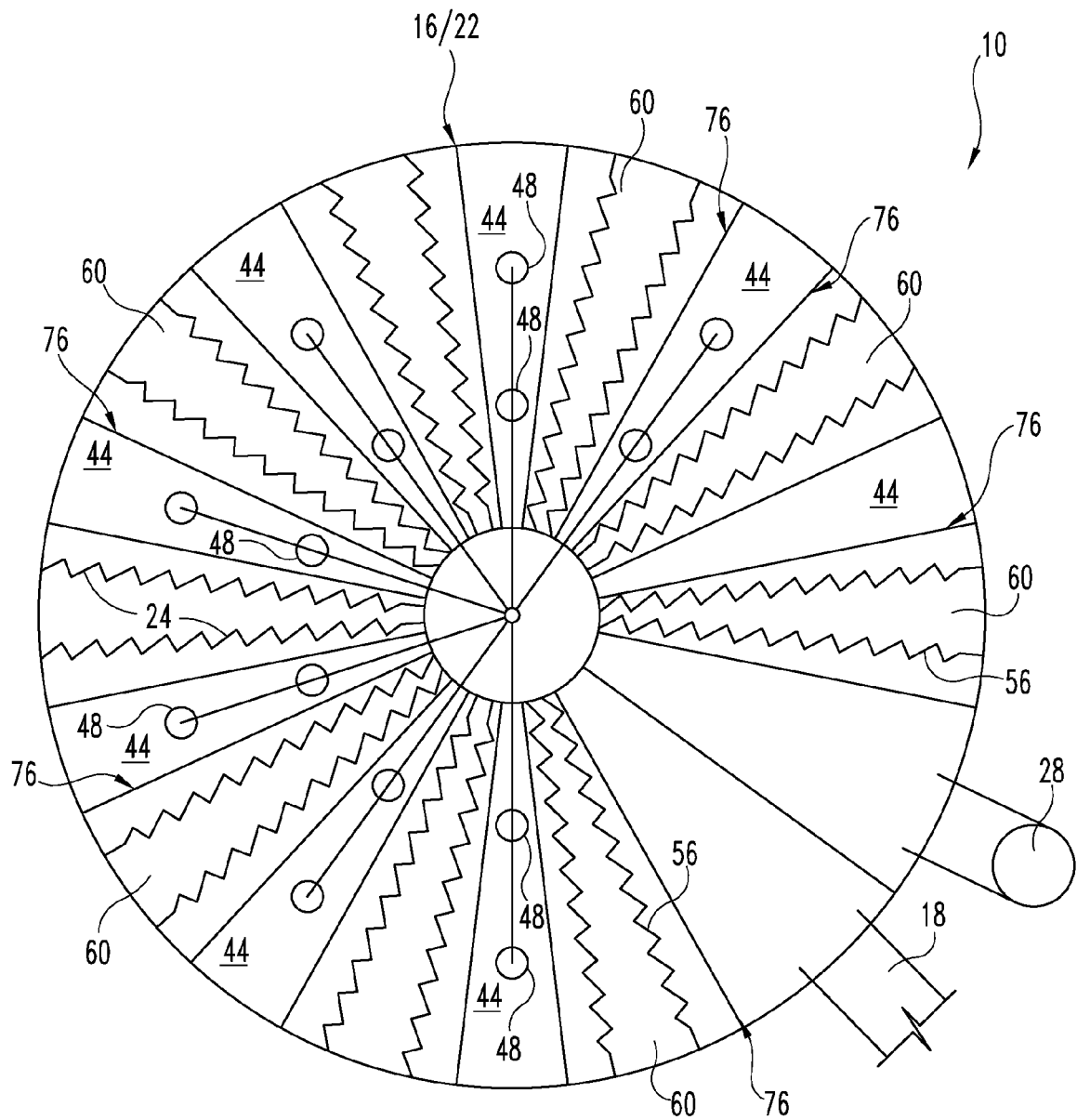
FIG. 5 illustrates a top cut-away view of the device of FIG. 4.

Referring now to FIGS. 4 and 5, another alternative version of the exhaust gas treatment device 10 comprises a storage tank 16 having a gas inlet 18 and an exhaust port 28, exhaust gas 12 being configured to enter the storage tank 16 through the inlet 18. The storage tank 16 comprises a plurality of baffle chambers 44, each baffle chamber 44 containing a scrubber 56 therein, and at least one chamber 44 having at least one spray nozzle 48 pointed generally downwardly and located generally at an upper surface 74 of the storage tank 16. The baffle chambers 44 are generally connected in series between the inlet 18 and the exhaust port 28. The storage tank 16 further comprises an accumulator portion 58 generally at the bottom 50 thereof, the accumulator portion 58 configured for collecting liquid bath 14 that is sprayed through the spray nozzles 48 in the baffle chambers 44 and drained through drain apertures 78 in a lower surface 80 of the storage tank 16. In one version, accumulator portion 58 has a pump recirculating means 54 for delivering the liquid bath 14 collected in the accumulator portion 58 back to the spray nozzles 48 or to an adjacently located reservoir tank 30 containing liquid bath 14 (shown in dashed-line form in FIG. 4). A reservoir tank 30 in one version is configured to supply liquid bath 14 for being sprayed through the spray nozzles 48 in the baffle chambers 44 of the storage tank 16.

In this version of an exhaust gas treatment device 10, exhaust gas 12 is introduced to the storage tank 16 through the inlet 18 and flows consecutively through the series of baffle chambers 44, and is introduced to the liquid bath 14 by the spray nozzles 48 raining the liquid bath 14 down upon the exhaust gas 12. In one version, the scrubbers 56 in each baffle chamber 44 are configured for increasing the surface area for contact between the liquid bath 14 and the exhaust gas 12 as well as for providing condensing surfaces 24 for retaining liquid bath 14 from being overly entrained within the exhaust gas 12 as it travels through the various baffle chambers 44. In one version, baffle walls 76 that define the baffle chambers 44 comprise the condensing surfaces 24 of the scrubber unit 22. In other versions, the condensing surfaces 24 comprise generally angularly oriented corrugated droplet retainers 60 alternatingly extending from the upper surface 74 and the lower surface 80 in the storage tank 16 for directing the exhaust gas 12 upwardly and downwardly through the baffle chambers 44 in the storage tank 16, thereby increasing the time and contact surface area for the gas 12 flowing through the spraying liquid bath 14 and impinging upon the condensing surfaces 24. In yet other versions, at least one baffle chamber 44 is provided proximate the exhaust port 28 without a spray nozzle 48 before the exhaust gas 12 is expelled. Entrained gas 12 flows through this at least one chamber 44 for substantially scrubbing any remaining entrained liquid bath 14 from the exhaust gas 12 and collecting such liquid bath 14 in the accumulator portion 58 below.

For the operation of the various versions of the exhaust gas treatment device 10 disclosed herein, a method is also provided for the treatment of exhaust gas 12 comprising the steps of passing the gas 12 through a liquid bath 14 in one or more bath chambers 44, passing the bathed gas 12 through a scrubber unit 22, and then expelling the gas 12 into the atmosphere. These steps of passing the gas 12 through the bath 14 and through the scrubber unit 22 may be performed using an exhaust gas treatment device 10 as disclosed herein. The liquid bath 14 through which the exhaust gas 12 is passed in one version comprises a solution of hydrocarbon compounds comprising organic structures of one or both of aromatic and aliphatic compounds.

While several versions have been disclosed herein, it is to be understood that the versions and variations shown and described are merely illustrative of the principals of the invention and that various modifications may be implemented by those skilled in the art without departing from the scope and spirit of the invention and the claims appended hereto:

What is claimed is:

1. An exhaust gas treatment device comprising: a tank containing a volume of a liquid bath, said tank having an exhaust gas inlet connected thereto, a scrubber unit communicatively connected to said tank and having an exhaust port connected thereto and a plurality of condensing surfaces therein, an exhaust gas being provided to enter said tank through said inlet, said tank being configured to introduce said gas to said liquid bath and to impinge said gas upon said condensing surfaces being configured to substantially remove amounts of said bath entrained in said gas, wherein said gas being treated by said liquid bath and scrubbed by said condensing surfaces being expelled into the atmosphere through said exhaust port.

2. The device of claim 1 further comprising a reservoir tank containing additional amounts of said liquid bath said reservoir tank being fluidly connected to said tank and said scrubber unit.

3. The device of claim 2 wherein said gas passes through said liquid bath in said tank and subsequently passes through said liquid bath contained in said reservoir tank prior to being scrubbed in said scrubber unit.

4. The device of claim 3 wherein said tank and said reservoir tank are supplementally fluidly connected by an overflow line.

5. The device of claim 3 further comprising at least one pump means for supplying said gas from said tank to said reservoir tank.

6. The device of claim 3 wherein said scrubber unit comprises an accumulator portion for collecting said amounts of said liquid bath removed from said gas, said accumulator portion being fluidly connected to said reservoir tank.

7. The device of claim 6 further comprising at least one recirculating pump for transferring said liquid bath collected in said accumulator portion to said reservoir tank.

8. The device of claim 3 further comprising a thermal reducer connected to said reservoir tank and configured for recirculating said liquid bath in said reservoir tank through a heat exchanger comprising said thermal reducer.

9. The device of claim 1 wherein said inlet is provided below a level of said liquid bath, said gas being introduced to said liquid bath by bubbling.

10. The device of claim 1 wherein said tank is multi-chambered comprising a plurality of baffle chambers communicatively interconnected in series, the last said baffle chamber in said series being connected to a transfer line connected to said scrubber unit, at least one said baffle chamber comprising at least one spray nozzle configured for spraying said liquid bath onto said gas as said gas flows through said baffle chamber, said tank further comprising a drain configured to collect said sprayed liquid bath and returning said liquid bath to said at least one spray nozzle.

11. The device of claim 10 wherein said at least one spray nozzle is supplied with said liquid bath from a reservoir tank, said drain delivering said sprayed liquid bath to said reservoir tank for returning to said spray nozzle.

12. The device of claim 10 wherein each said baffle chamber comprises at least one set of three spray nozzles.

13. The device of claim 12 comprising at least two sets of three spray nozzles.

14. The device of claim 12 or claim 13 wherein said spray nozzles are configured to spray said liquid bath as a mist.

15. The device of claim 10 wherein each said spray nozzle is optimally configured for contacting said gas as it flows through said baffle chamber.

16. The device of claim 1 wherein said condensing surfaces comprise a plurality of scrubbers configured to cause condensate of said liquid bath to drain into an accumulator portion provided in said scrubber unit, said accumulator portion being fluidly connected to said tank.

17. The device of claim 16 wherein said scrubbers comprise a plurality of corrugated droplet retainers configured to be impinged upon by said gas as it flows through said scrubber unit.

18. The device of claim 16 wherein said scrubbers comprise a stacked series of spaced apart rings, said rings having consecutively smaller condensing surface areas from the lowest said ring to the highest said ring, said series further comprising a cap, said rings comprising generally flat and radially angularly downwardly oriented annular side portions configured for radially directing said gas and said condensate to said accumulator portion, said rings further comprising a generally central aperture, said gas flowing radially through gaps between said spaced apart rings and axially through said central apertures to said exhaust port of said scrubber unit.

19. The device of claim 1 wherein said scrubber unit is provided within said tank, said tank comprising a plurality of baffle chambers, at least one said baffle chamber containing at least one condensing surface therein and at least one spray nozzle therein generally at an upper surface of said tank and pointing generally downwardly, said baffle chambers being generally fluidly connected in series between said inlet and said exhaust port, said tank further comprising an accumulator portion configured to collect said liquid bath sprayed through said at least one spray nozzle and to recirculate said liquid bath collected therein to said at least one spray nozzle.

20. The device of claim 19 wherein said accumulator portion recirculates said liquid bath with a recirculating pump.

21. The device of claim 20 further comprising a reservoir tank containing amounts of said liquid bath and configured to deliver said liquid bath to said at least one spray nozzle, said accumulator portion recirculating said collected liquid bath to said reservoir tank.

22. The device of claim 19 wherein baffle walls defining said baffle chambers comprise said condensing surfaces, said condensing surfaces comprising corrugated droplet retainers alternatingly extending from said upper surface and a lower surface in said tank, said upper and lower surfaces generally defining upper and lower limits of said baffle chambers, said lower surface comprising drain apertures fluidly connecting said baffle chambers and said accumulator portion for the collection of said liquid bath.

23. The device of claim 22 wherein at least the last baffle chamber in said, series is provided without a spray nozzle.

24. The device of claim 1 wherein said gas additionally passes through a filter between said inlet and said exhaust port.

25. The device of claim 1 wherein said liquid bath comprises a solution of hydrocarbon compounds, said compounds comprising organic structures of one or both of aromatic and aliphatic compounds.

26. The device of claim 25 wherein standard viscosity of said liquid bath prior to removal of any exhaust products is about 1 centipoise and a measurement of the viscosity of the liquid bath of about 4 centipoise and greater indicates that said liquid bath has no remaining capacity.

27. The device of claim 1 wherein said liquid hydrocarbon bath comprises a combination of short chain alkanes condensed from fumes collected from heated asphaltic impregnates.

28. The device of claim 25, further comprising a photo sensor device configured to measure light refraction through said liquid bath, wherein said light refraction indicates remaining capacity.

29. The device of claim 1, wherein said exhaust gas is cooled prior to entering said inlet.

30. The device of claim 29, wherein said exhaust gas is cooled down to between about 300° and 600° F.

* * * * *